(12) United States Patent
Kanevsky et al.

(10) Patent No.: US 8,265,939 B2
(45) Date of Patent: Sep. 11, 2012

(54) HIERARCHICAL METHODS AND APPARATUS FOR EXTRACTING USER INTENT FROM SPOKEN UTTERANCES

(75) Inventors: Dimitri Kanevsky, Ossining, NY (US); Joseph Simon Reisinger, Austin, TX (US); Robert Sicconi, Ridgefield, CT (US); Mahesh Viswanathan, Yorktown Heights, NY (US)

(73) Assignee: Nuance Communications, Inc., Burlington, MA (US)

( * ) Notice: Subject to any disclaimer, the term of this patent is extended or adjusted under 35 U.S.C. 154(b) by 447 days.

(21) Appl. No.: 11/216,483

(22) Filed: Aug. 31, 2005

(65) Prior Publication Data

US 2007/0055529 A1 Mar. 8, 2007

(51) Int. Cl.
*G10L 21/00* (2006.01)
(52) U.S. Cl. .................. 704/275; 704/251; 704/270
(58) Field of Classification Search ............. 704/9, 257, 704/275, 270, 270.1
See application file for complete search history.

(56) References Cited

U.S. PATENT DOCUMENTS

| | | | |
|---|---|---|---|
| 6,092,192 A | 7/2000 | Kanevsky et al. | |
| 6,236,968 B1 | 5/2001 | Kanevsky et al. | |
| 6,272,455 B1* | 8/2001 | Hoshen et al. | 704/1 |
| 6,505,162 B1* | 1/2003 | Wang et al. | 704/275 |
| 6,553,345 B1* | 4/2003 | Kuhn et al. | 704/275 |
| 6,587,818 B2 | 7/2003 | Kanevsky et al. | |
| 6,631,346 B1* | 10/2003 | Karaorman et al. | 704/9 |
| 6,839,896 B2* | 1/2005 | Coffman et al. | 719/310 |
| 2001/0041980 A1* | 11/2001 | Howard et al. | 704/270 |
| 2002/0103641 A1* | 8/2002 | Kuo et al. | 704/231 |
| 2002/0103837 A1* | 8/2002 | Balchandran et al. | 707/534 |
| 2002/0135618 A1* | 9/2002 | Maes et al. | 345/767 |
| 2002/0198714 A1* | 12/2002 | Zhou | 704/252 |
| 2003/0009338 A1* | 1/2003 | Kochanski et al. | 704/260 |
| 2003/0187659 A1* | 10/2003 | Cho et al. | 704/275 |
| 2003/0233230 A1* | 12/2003 | Ammicht et al. | 704/235 |
| 2004/0128141 A1* | 7/2004 | Murase et al. | 704/275 |
| 2004/0204940 A1* | 10/2004 | Alshawi et al. | 704/240 |
| 2004/0249632 A1* | 12/2004 | Chacon | 704/9 |
| 2004/0249638 A1* | 12/2004 | Wang | 704/246 |
| 2005/0075878 A1* | 4/2005 | Balchandran et al. | 704/257 |
| 2005/0119894 A1* | 6/2005 | Cutler et al. | 704/270 |
| 2005/0165607 A1* | 7/2005 | Di Fabbrizio et al. | 704/256 |
| 2005/0187772 A1* | 8/2005 | Azara et al. | 704/260 |
| 2005/0278180 A1* | 12/2005 | O'Neill et al. | 704/275 |

* cited by examiner

*Primary Examiner* — Jialong He
(74) *Attorney, Agent, or Firm* — Wolf, Greenfield & Sacks, P.C.

(57) ABSTRACT

A technique for determining intent associated with a spoken utterance of a user comprises the following steps/operations. Decoded speech uttered by the user is obtained. An intent is then extracted from the decoded speech uttered by the user. The intent is extracted in an iterative manner such that a class is determined after a first iteration and a sub-class of the class is determined after a second iteration. The class and the sub-class of the class are hierarchically indicative of the intent of the user, e.g., a target and data that may be associated with the target. The user intent extracting step may further determine a sub-class of the sub-class of the class after a third iteration, such that the class, the sub-class of the class, and the sub-class of the sub-class of the class are hierarchically indicative of the intent of the user.

30 Claims, 7 Drawing Sheets

HIERARCHICAL METHODS AND APPARATUS FOR EXTRACTING USER INTENT FROM SPOKEN UTTERANCES

FIELD OF INVENTION

The present invention relates generally to speech processing systems and, more particularly, to systems for hierarchically extracting user intent from spoken utterances, such as spoken instructions or commands.

BACKGROUND OF THE INVENTION

The use of a speech recognition system (or a voice system) to translate a user's spoken command to a precise text command that the target system can input and process is well known. For example, in a conventional voice system based in a vehicle, a user (e.g., driver) interacts with the voice system by uttering very specific commands that must be consistent with machine-based grammar that is understood by the target system.

By way of example, assume that the climate control system in the vehicle is the target system. In order to decrease the temperature in the vehicle, the user of a conventional voice system may typically have to utter several predetermined machine-based grammar commands, such as the command "climate control" followed by the command "air conditioner" followed by the command "decrease temperature" followed by the command "five degrees."

Unfortunately, people do not talk or think in terms of specific machine-based grammar, and may also forget the precise predetermined commands that must be uttered to effectuate their wishes.

One approach that attempts to overcome the machine-based grammar problem is to use a single-stage front end action classifier that detects a very general subject from the user's speech, which is then provided to a human operator for further intent determination. This is typically the approach used in the General Motors' OnStar™ system. However, a major problem with this approach is that a human operator is required.

Another approach is to build a full-fledged statistical parser, which takes the input as transcribed and builds a parse tree which is mined later to extract intent. One major difficulty in this second approach is that statistical parsers are huge in terms of storage requirements. Further, they require hand-tuning in every step. That is, every time data is added, the statistical parser requires a tremendous amount of hand-tuning and balancing of the new data with the old data.

Accordingly, improved techniques are needed that permit a user to employ more human-based grammar (i.e., free form or conversational input) while addressing a target system via a voice system.

SUMMARY OF THE INVENTION

Principles of the present invention provide improved techniques for permitting a user to employ more human-based grammar (i.e., free form or conversational input) while addressing a target system via a voice system.

In one aspect of the invention, a technique for determining intent associated with a spoken utterance of a user comprises the following steps/operations. Decoded speech uttered by the user is obtained. An intent is then extracted from the decoded speech uttered by the user. The intent is extracted in an iterative manner such that a first class is determined after a first iteration and a sub-class of the first class is determined after a second iteration. The first class and the sub-class of the first class are hierarchically indicative of the intent of the user, e.g., a target and data that may be associated with the target.

The multi-stage intent extraction approach may have more than two iterations. By way of example only, the user intent extracting step may further determine a sub-class of the sub-class of the first class after a third iteration, such that the first class, the sub-class of the first class, and the sub-class of the sub-class of the first class are hierarchically indicative of the intent of the user.

In a preferred embodiment, as will be explained in further detail below, the first class may represent a target (e.g., topic) associated with the user intent, the sub-class of the first class may represent an action (e.g., function) associated with the target, and the sub-class of the sub-class of the first class may represent data associated with the action. One or more commands may then be provided to a target system based on the class and sub-class determinations.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
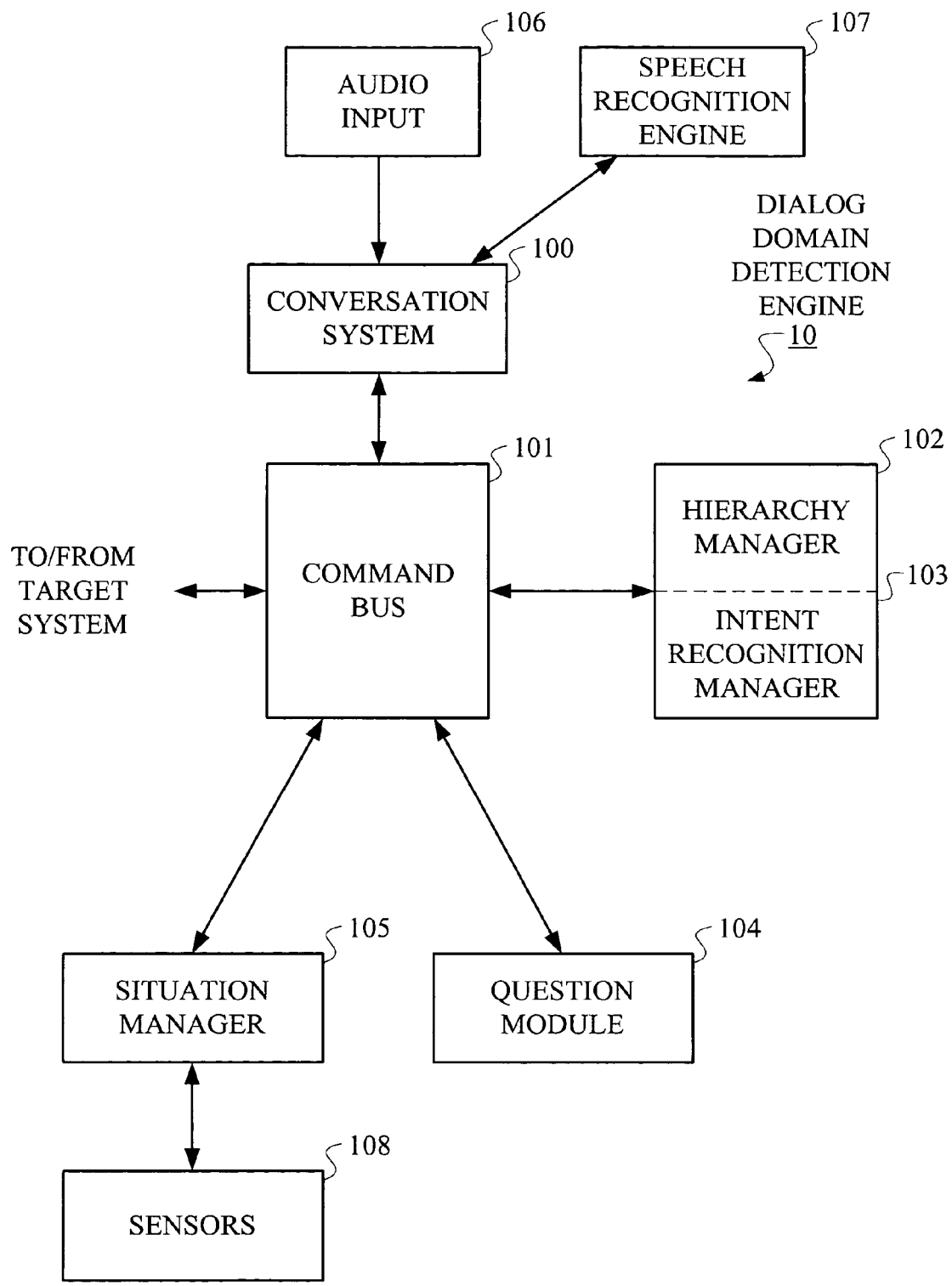
FIG. 1 illustrates a block diagram of a hierarchical system for extracting user intent from a spoken utterance, according to an embodiment of the invention.

While the present invention may be illustratively described below in the context of a vehicle-based voice system, it is to be understood that principles of the invention are not limited to any particular computing system environment or any particular speech recognition application. Rather, principles of the invention are more generally applicable to any computing system environment and any speech recognition application in which it would be desirable to permit the user to provide free form or conversational speech input.

Principles of the invention address the problem of extracting user intent from free form-type spoken utterances. For example, returning to the vehicle-based climate control example described above, principles of the invention permit a driver to interact with a voice system in the vehicle by giving free form voice instructions that are different than the precise (machine-based grammar) voice commands understood by the climate control system. Thus, in this particular example, instead of saying the precise commands "decrease temperature" and "five degrees," in accordance with principles of the invention, the drivers may say "make it cooler." The system interprets "it" and "cooler" and associates the phrase with a temperature and asks one or more additional questions to clarify the user intent.

To do this, the system detects a dialog domain, such as in the following examples (the illustrative free form-type spoken utterance is to the left of the arrow and the illustrative detected dialog domain is to the right of the arrow):

Turn the AC up→CLIMATE
Set the temperature to 76 degrees→CLIMATE
Set the radio to one oh one point seven FM→AUDIO and AUDIO_RadioStation
What features are available in this system→HELP
Switch off the CD player→AUDIO or AUDIO_CD
What are the current traffic conditions→TRAFFIC
How is the rush hour traffic in New York city→TRAFFIC
What is tomorrow's weather forecast for Boston→WEATHER
What are the road conditions for my route→TRAFFIC
How do I use the point of interest application→HELP
How far is Hollywood→NAVIGATION
Increase volume→AUDIO or AUDIO_Volume
Raise fan speed→CLIMATE
Scan for a rock-and-roll station in this area→AUDIO and AUDIO_RadioStation
I am looking for Chinese food→RESTAURANTS
My destination is the Mid-Hudson bridge→NAVIGATION As will be illustratively explained herein, principles of the invention are able to determine intent associated with a spoken utterance of a user by obtaining decoded speech uttered by the user (e.g., from a speech recognition engine), and extracting an intent from the decoded speech uttered by the user, wherein the intent is extracted in an iterative manner such that a first class is determined after a first iteration and a sub-class of the first class is determined after a second iteration. The first class and the sub-class of the first class are hierarchically indicative of the intent of the user, e.g., a target and data that may be associated with the target. Of course, the multi-stage approach may have more than two iterations. By way of example only, the user intent extracting step may further determine a sub-class of the sub-class of the first class after a third iteration, such that the first class, the sub-class of the first class, and the sub-class of the sub-class of the first class are hierarchically indicative of the intent of the user.

In a preferred embodiment, as will be explained in further detail below, the first class may represent a target (e.g., topic) associated with the user intent, the sub-class of the first class may represent an action (e.g., function) associated with the target, and the sub-class of the sub-class of the first class may represent data associated with the action. One or more commands may then be provided to a target system based on the class and sub-class determinations.

Advantageously, principles of the invention provide a multi-stage system that extracts more and more information from the same sentence as it goes along.

In another example where the target system is an audio system of the vehicle, the free form utterance "turn the volume up" may result in a detected class "Audio" after a first stage (or first iteration), a sub-class "Audio_Volume" after a second stage (or second iteration), and a sub-class "Audio_Volume_Up" (which is a sub-class of the sub-class "Audio") after a third stage (or third iteration).

In a preferred embodiment, this may be accomplished via attribute value pair (AVP) extraction in a top-down fashion. Thus, each stage or level in the multi-stage system acts as an elemental AVP extractor or semantic analyzer of the sentence. The advantage is that the multi-stage system of the invention is not tagging each word with labels as would occur in a statistical parser or attaching a semantic label as would occur in a linguistic parser, rather the multi-stage system is adding class, sub-class, and sub-class (of the sub-class) information, which is far simpler to do. Also, the methodology is iterative because the same process is applied at each subsequent level with only finer and finer class labels.

Table 1 below is an example of the multi-level class labels (e.g., hierarchical structure) that may be associated with the audio example:

TABLE 1

| Level 1: | AUDIO | | |
|---|---|---|---|
| Level 2: | AUDIO_RADIO | AUDIO_VOLUME | |
| Level 3: | Aud._Radio_on | Aud._Radio_off | A_Radio_Station |
| | Aud._volume_down | Aud._volume_up | |

In order to be able to decode (or recognize) the free form speech, an initial training data set may be used. The process is automated wherein a small model is built with a relatively small data set. Then, the training process iterates when new data is added, using the initial model to label the new data set.

Further, the multi-stage system can also be employed with lower level parsers or metadata. That is, most of the intent determination processing uses the hierarchical action classification approach of the invention. However, when the system gets down to some very specific part of the user request, e.g., complicated navigation request that has a "to city," a "from city," and/or some other peripheral information like avoiding the most congested roads, this can make the request complicated. Within the hierarchical action classification of the invention, while this lower level information in the utterance can be annotated, the system can utilize added metadata and/or use a simple kind of parser, at the lowest stage or level, for extracting items such as "to" and "from" information. Thus, instead of building an entire statistical parser for the entire corpus of data, principles of the invention are able to use a smaller domain dependent subset of the data.

Referring initially to FIG. 1, a hierarchical system for extracting user intent from a spoken utterance, according to an embodiment of the invention, is depicted. As shown, the system referred to as a dialog domain detection (DDE) engine 10 comprises conversational system 100, command bus 101, hierarchy manager 102, intent recognition manager 103, question module 104, situation manager 105, audio input 106, speech recognition system 107, and sensors 108.

Conversational system 100 functions as a dialog manager. Audio input 106 represents the spoken utterances captured by the system that are being processed to determine intent. Conversational system 100 sends the audio input to speech recognition engine 107, which then decodes the audio and returns text, representative of what the speech recognition engine recognized, back to conversational system 100. It is to be appreciated that the invention is not limited to any particular speech recognition engine and, thus, any suitable speech recognition system can be employed. By way of example only, the IBM Corporation (Armonk, N.Y.) Embedded ViaVoice™ engine could be employed.

The command bus 101 serves as a central communication bus between the components of the DDE engine.

Hierarchy manager 102 (as will be explained in further detail below in the context of FIG. 2) imposes the top-down iterative structure used by intent recognition manager 103 (as will be explained in further detail below in the context of FIG. 3) to extract intent from the spoken utterance of the user. For example, in the audio example, the above-described multi-level class labels in Table 1 may serve as the imposed hierarchical structure.

That is, hierarchy manager 102 sets the number of levels or stages that intent recognition manager 103 will traverse for a given intent determination session. More particularly, hierarchy manager dictates, at each level, the permitted inputs and the permitted results (e.g., class labels). Then, intent recognition manager 103 traverses (top to bottom) the hierarchical structure set by the hierarchy manager. As it traverses down the structure, intent recognition manager 103 expects hierarchy manager 102 to inform it, at this level, what structure can be imposed. Thus, intent recognition manager keeps referring back to the hierarchy manager.

Intent recognition manager 103 has an additional function. It is also serves as an interface for the logical, multi-tiered view of the user-input sentence. Conversational system 100 may utilize such a logical view of the sentence.

Thus, the intent gets clarified as the intent recognition manager walks down the structure. As the hierarchy manager informs that it can provide certain information, the intent recognition manager walks down the structure and determines a particular intent at each level, from broad to narrow. The particular intent determined at each level is referred to herein as an "interpretation." In the audio example, the top level intent is going to be the audio system. However, this does not mean much since there are any number of actions that can be taken with respect to the audio system. The next level could determine that the user is referring to a radio station. The next level could determine a particular radio station that the user wishes to be selected. Thus, instead of saying "XM Radio," "set radio channel," and "channel 47," the DDE engine of the invention permits the user to say "I want to listen to channel 47." Therefore, the intent recognition manager starts with a vague picture, or actually with nothing, and tries to come up with a highly tuned view of what the intent is.

Question module 104 generates questions that can be asked of the user that may be used to assist the system with determining intent. As is known, dialog managers are able to coordinate the asking of questions to a speaker, the responses to which further clarify any ambiguity that remains from the previous user input. Thus, as is known, question module may comprise a text-to-speech engine capable of generating questions that are audibly output to the user. The responses are processed through the speech recognition engine and provided to the conversational system which coordinates their use with the intent recognition manager. Further, when an intent is determined by the system, question module 104 could serve to ask the user to confirm that intent before the system sends the appropriate command(s) to the target system.

Sensors 108 may comprise one or more sensors that describe external situations (e.g., weather, speed, humidity, temperature, location via a global positioning system, etc.) and personal characteristics (e.g., biometrics—voice, face characteristics, tired, sleepiness conditions). This information, coordinated by situation manager 105, may also be used to determine intent of the user and/or assist in providing a response to the user.

While the invention is not limited to any particular question module architecture or external situation manager architecture, examples of techniques that could be employed here are described in U.S. Pat. Nos. 6,092,192; 6,587,818; and 6,236,968.

Figure 2:
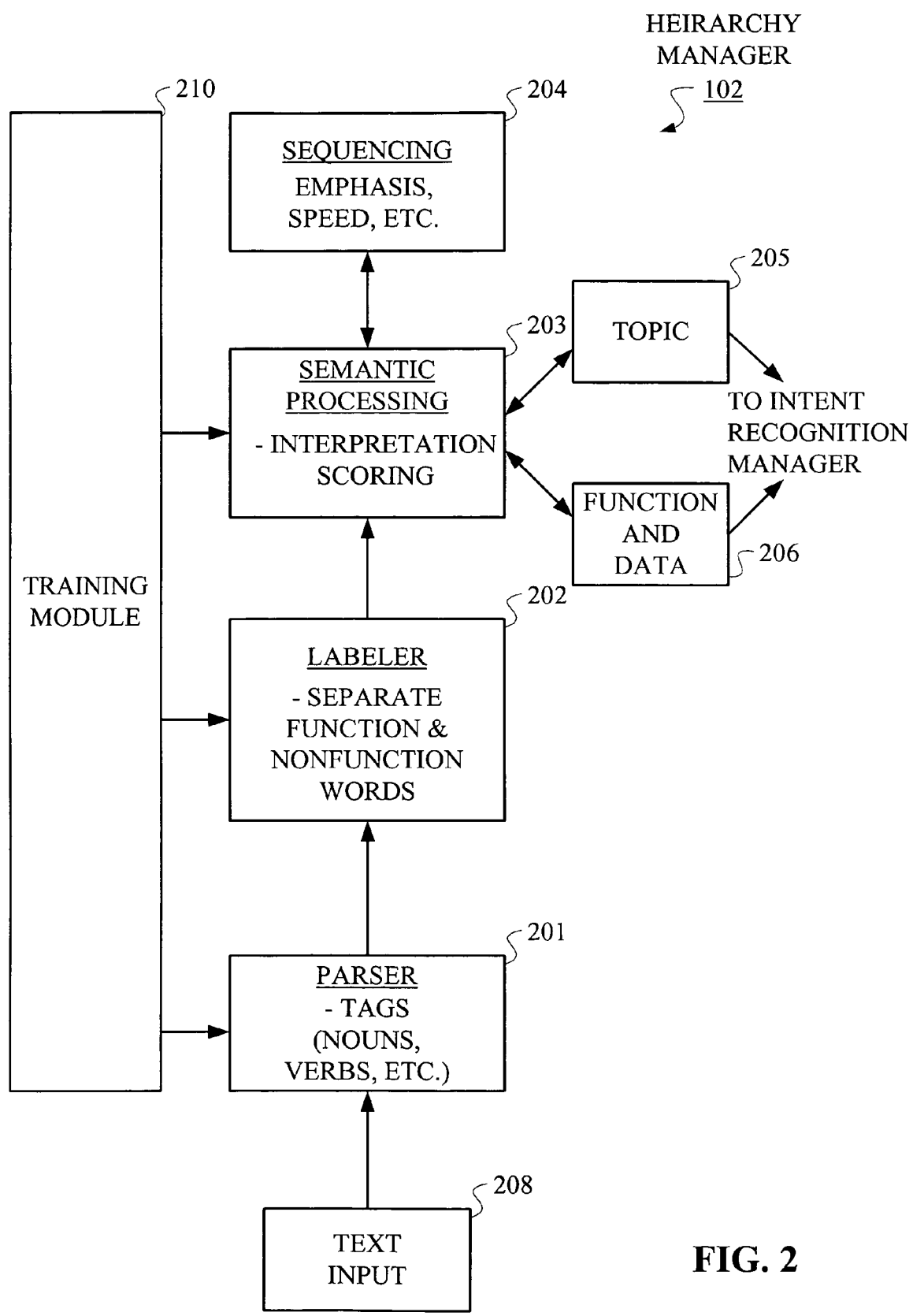
FIG. 2 illustrates a block diagram of a hierarchy manager, according to an embodiment of the invention.

Referring now to FIG. 2, a hierarchy manager, according to an embodiment of the invention, is depicted. As shown, hierarchy manager (102 in FIG. 1) comprises parser 201, labeler 202, semantic processing module 203, sequencing module 204, topic 205, function and data 206, text input 208, and training module 210.

Parser 201 receives as input text 208. It is to be appreciated that text 208 represents the decoded speech, i.e., the result of the audio input (106 in FIG. 1) being decoded by the speech recognition engine (107 in FIG. 1). The role of parser 201 is to tag the parts of speech of the decoded text, e.g., nouns, verbs, other grammatical terms or phrases. The parser can utilize meta information or even external mark up to describe the tagged portions of the text.

Labeler 202 separates function and non-function words in the text. That is, it is understood that some words in the text are more valuable (function words) than other words (non-function words) in determining intent. To do this, the words in the text are weighted by the labeler. The weighting may be done by accessing the domain dependent model and scoring the words in the text against all potential words. The importance of the word depends on its score, i.e., words with higher scores are considered more important. Words at or above a threshold score may be considered function words, while words below a threshold score may be considered non-function words.

Semantic processor 203 then interprets the scores assigned by the labeler. For example, the semantic processor may determine for a given input sentence that terms associated with audio have more weight than terms associated with climate control. Thus, the semantic processor accepts all the interpretations, does a relative scoring, applies a threshold, and decides, for example, that the top three interpretations should be taken as the most relevant ones.

Interpretation means intent in this context. Thus, for each input utterance, the labeler produces a list of interpretations and attendant scores. Since this is a statistical approach, there are no unambiguously correct labels produced, but instead a list of interpretations covering all possible interpretations. The semantic processor applies intelligent thresholding to discard low scores that are possible but of low probability based on prior knowledge or simple thresholding. Prior knowledge can include user knowledge derived from the training data, and simple thresholding can includes retaining a fixed number of interpretations (e.g., three), or retaining all interpretations within a fixed percentage of the best scoring label. These are all parameters that can be made available to an agent deploying the system via operating panels. By way of one example, semantic processor 203 may employ techniques disclosed in U.S. Pat. No. 6,236,968.

The interpreted result is a three-tuple (a group of three sub-results). That is, in this particular embodiment, to "understand" a command three entities are extracted and analyzed: (1) the machine (target or topic 205) that is operated upon (e.g., Audio. Navigation); (2) the action (function 206) to be performed (e.g., switch, turn, move); and (3) the data 206 that is provided with the action (e.g., on/off, up/down, left/right). By way of example, Table 1 above illustrates the hierarchical structure from which the three-tuple may be determined. It is to be understood that while hierarchy manager 102 and intent recognition manager 103 are illustrated in FIG. 1 as logically separate components, the components may be implemented in a single functional module due to their tightly coupled functionality.

Sequencing module 204 is used to apply global rules on which part of the sentence is more important because, for example, it is first in order in the sentence or because it is the premise of the sentence or because the user used more emphasis on it.

The idea of sequencing or timing here relates to separating, within a complex request from the user, the primary request from a secondary one. For example, where the target system is a navigation system, assume a user says "Find me a McDonald's with parking." The principal request is find me a McDonald's. The parking is a secondary request. The sequencer informs the semantic processor that the concept of "finding a McDonald's" should take precedence or is more important than the concept of "parking."

Such sequencing may be determined from any nuances in the user's utterance that guide the search for the correct interpretation. An emphasized word or phrase carries more weight. The speeding up of a phrase within a sentence may carry additional indicators of importance, etc. So this module attempts to perform a fine-grained analysis of the user's nuances.

Training module 210 serves to train parser 201, labeler 202, and semantic processor 203.

Figure 3:
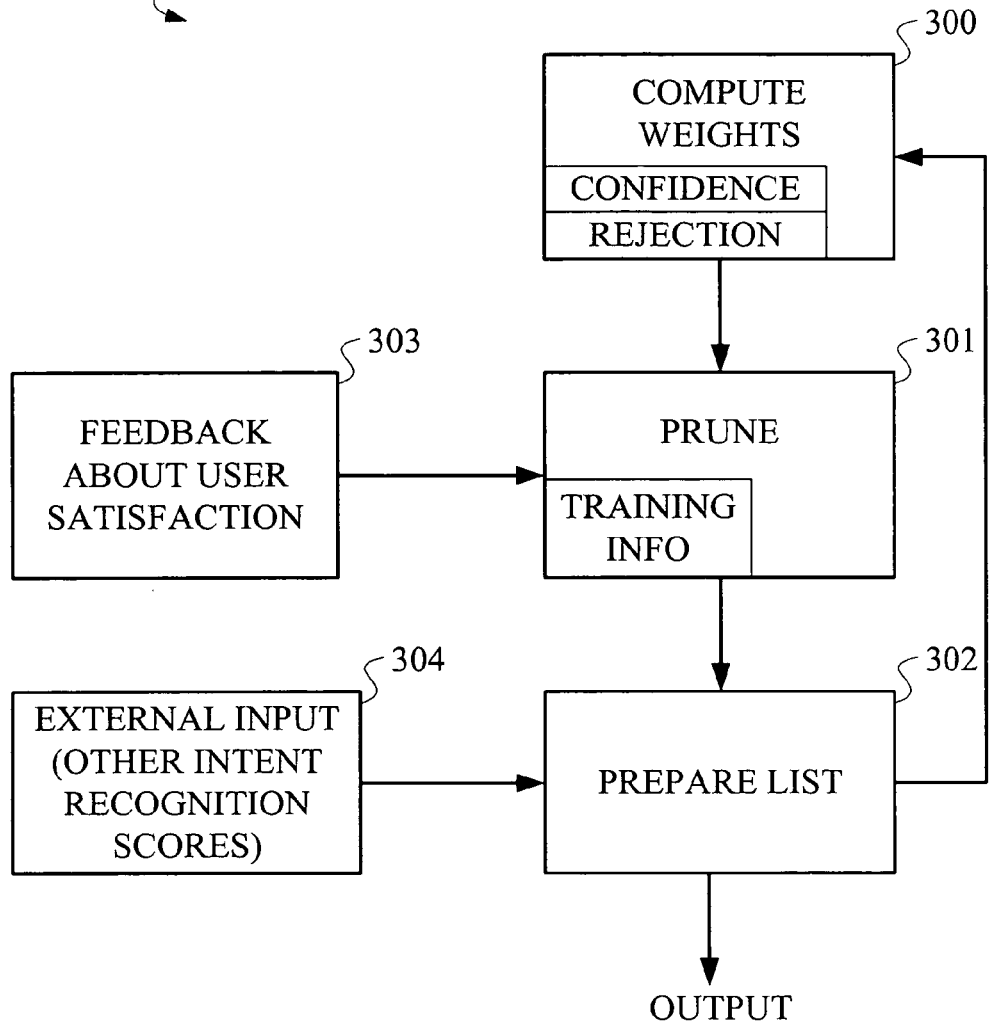
FIG. 3 illustrates a block diagram of an intent recognition manager, according to an embodiment of the invention.

Referring now to FIG. 3, an intent recognition manager, according to an embodiment of the invention, is depicted. As shown, intent recognition manager (103 in FIG. 1) comprises weight computation module 300, pruning module 301, list preparation module 302, feedback 303, and external input 304.

Weight computation module 300 computes the weights of the different words in the user utterance and applies two kinds of quantitative tests. The first is to compute whether the words in the utterance are above a fixed threshold. This is the rejection mechanism which decides whether to accept the user utterance for analysis or reject it outright as being outside the realm of its capability. Systems built for use in a car are unlikely to "understand" questions about other general subjects. In other words, it has to be able to detect that the user used words that are outside its vocabulary. The rejection mechanism is one way to do this. The second quantitative test is the confidence scores. These are the relative scores of the multiple interpretations of the user utterance.

Pruning module 301 prunes the list from weight computation module 300. The output from weight computation module 300 nominally will include all possible candidate interpretations. Pruning module 301 decides which ones are worth keeping. Some scores from weight computation module 300 may be too small to consider, not relevant, or too small in magnitude relative to the top scoring interpretations. A "worthiness" test may be derived from the training data. Further, the pruning module can include a control panel and additional controls that can be adjusted with input from customer satisfaction tests (feedback 303).

List preparation module 302 prepares the final intent list. The search for the interpretation is usually done in a hierarchical fashion with each level in turn revealing the topic, function, and data. Hence, the scoring, pruning and list preparing tasks are iterative as the scores are carried from one level to the next. In one embodiment, the top three scorers from the top level are expanded to the next level. The top three are appropriate it has been proven from computing with training data that 98.5% of the time the correct interpretation is within the top three results.

In addition, external inputs 304 (e.g., other intent recognition scores) can be utilized to generate the list in 302.

Figure 4:
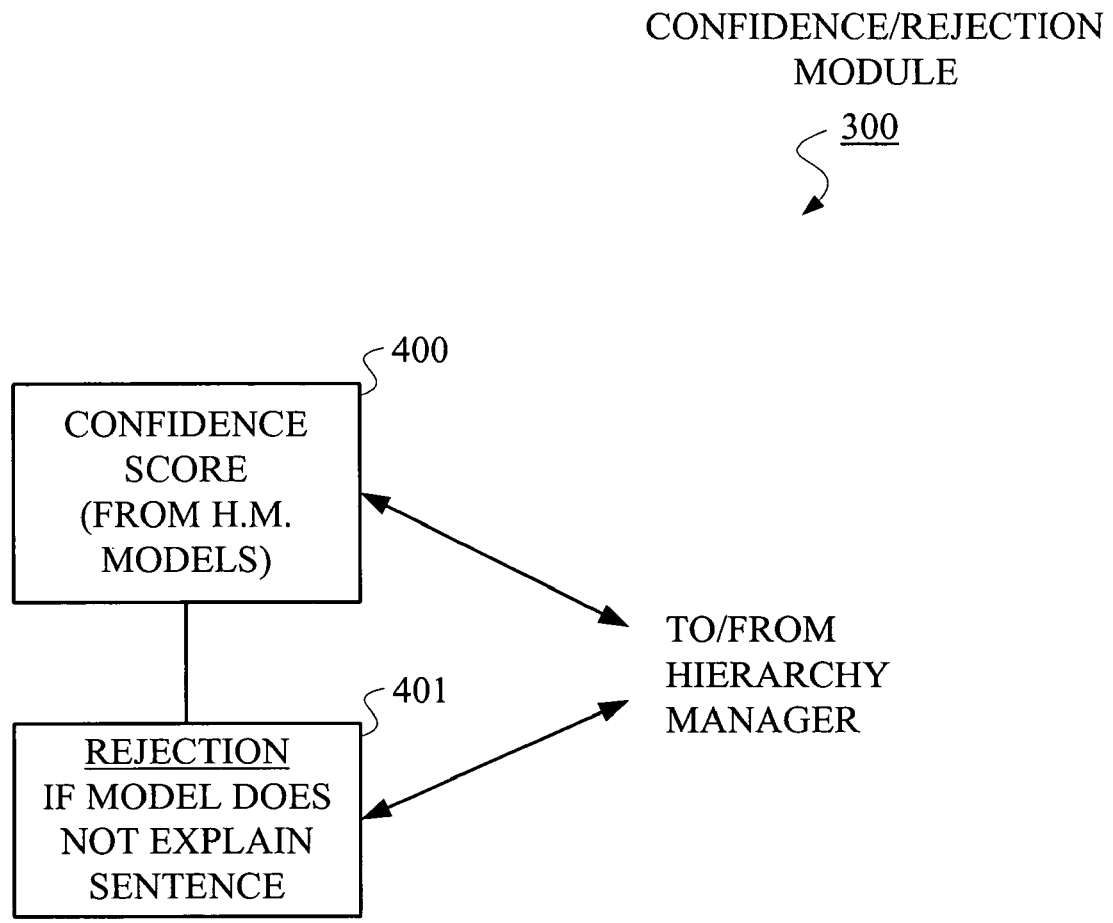
FIG. 4 illustrates a block diagram of a confidence/rejection module, according to an embodiment of the invention.

Referring now to FIG. 4, a confidence/rejection module, according to an embodiment of the invention, is depicted. It is to be understood that FIG. 4 depicts the confidence score and rejection mechanisms shown in weight computation module 300 of FIG. 3.

More particularly, in one embodiment, the confidence score for an utterance is the ratio of words in-vocabulary to the total number of words in the utterance. Hence, if all the words in the utterance are found in the system's vocabulary, then the confidence score is 1. If none are, it is zero. If the ratio is less than 0.5, then the utterance is rejected. Block 400 computed the confidence score and block 401 applies the rejection mechanism.

This operation can also be understood as follows. The confidence score tries to determine how many of the words are in the system vocabulary versus out of the system vocabulary. If all of the words are in the vocabulary, the word scores are accepted as is. If a fraction of the words are not in the vocabulary, then those words are handicapped to the extent they are not in the vocabulary. For example, if 75 percent of the words are in the vocabulary, every score coming out of the word score computation is handicapped (i.e., by multiplying by 0.75). That cascades down the hierarchy. The siblings are also penalized to that extent.

Figure 5:
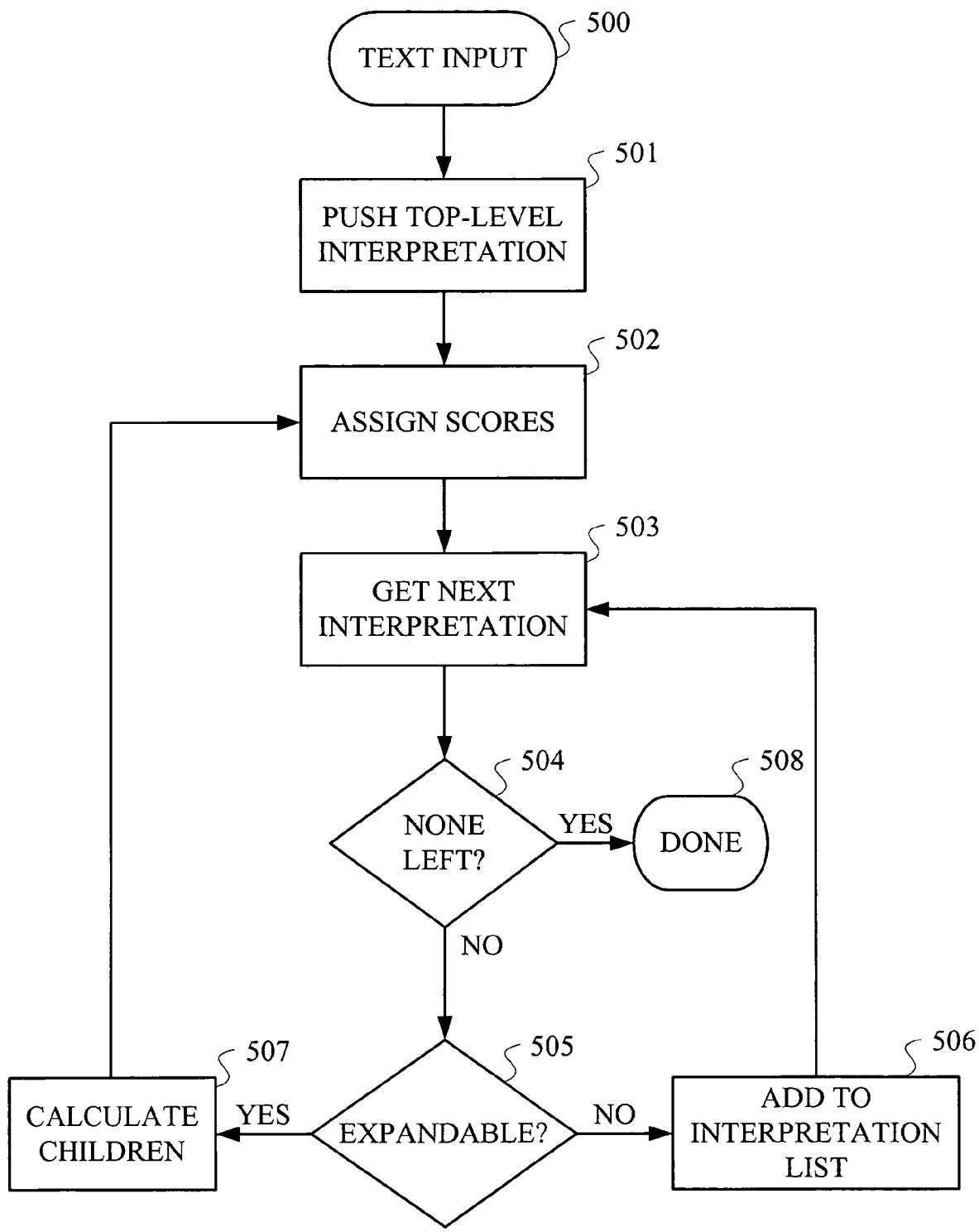
FIG. 5 illustrates a flow diagram of a run-time methodology for use in hierarchically extracting user intent from a spoken utterance, according to an embodiment of the invention.

Referring now to FIG. 5, a run-time methodology for use in hierarchically extracting user intent from a spoken utterance, according to an embodiment of the invention, is depicted.

In general, the input utterance is applied to the system (i.e., applied against the system model) and the system will return an interpretation, e.g., a three-tuple comprising [topic][function][data]. Hence, an input "turn the volume up" will generate multiple interpretations:

[Audio] [Volume] [up]
[Climate] [temperature] [up]
[Audio] [Volume] [down] . . . .

Each will have a computed score associated with it. FIG. 5 shows a flow chart of how these interpretations are generated. An initial model tree created during training contains all possible paths that can yield a result. Traversing down this tree from the top node to a leaf node yields several interpretations per level. So, for example, nine interpretations from the top level are pruned down to three. Each of the nodes of the tree are expanded to their child nodes. For example, "Audio" above may yield "Audio_Volume," "Audio_Treble," and "Audio_CD"), and "Climate" may yield three more of its children. Similarly, "Audio_Volume" will be split into its children. The process stops after three levels. In some cases, there may be fewer than three levels simply because there is not adequate data to warrant a third level.

Thus, as specifically shown in FIG. 5:
Step 501—Push top-level interpretation that operates with the text input 500.
Step 502—Assign scores for interpretations from step 501.
Step 503—Get next interpretation.
Step 504—Check if anything is left (None Left?).
Step 505—If "No" for step 504, then check if node is expandable.
Step 506—If not expandable, then add to interpretation list and go to get next interpretation (step 503).
Step 507—Otherwise (if expandable), calculate children and go to assign scores (step 502).
If none left in step 504, then methodology is done (508).

Figure 6:
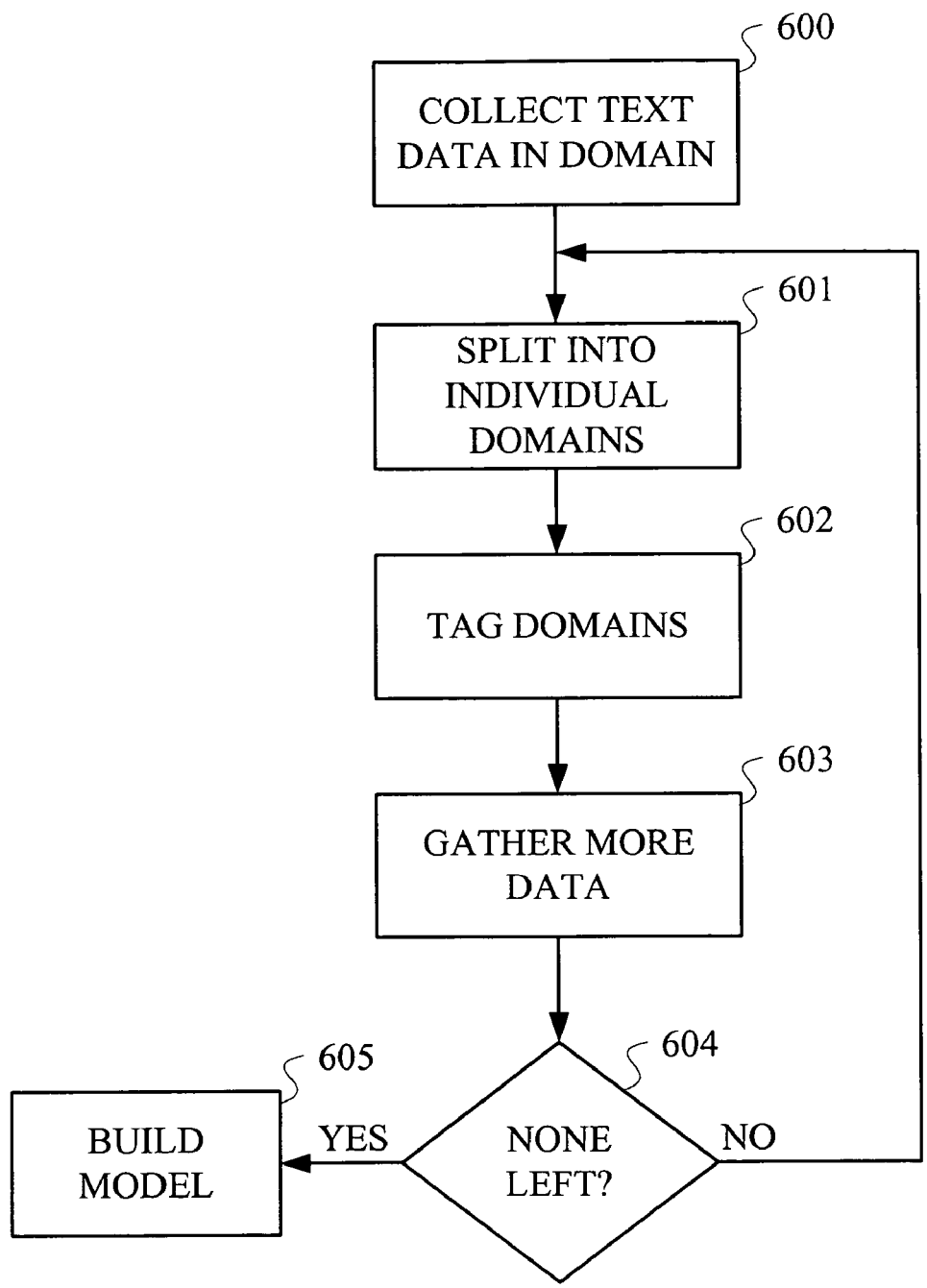
FIG. 6 illustrates a flow diagram of a training methodology for use in hierarchically extracting user intent from a spoken utterance, according to an embodiment of the invention.

Referring now to FIG. 6, a training methodology for use in hierarchically extracting user intent from a spoken utterance, according to an embodiment of the invention, is depicted.

In general, first, we decide on the domain in which this system will operate. Data is then collected in that domain, rejecting all data that is outside the domain. These data are then carefully divided into multiple "topic" domains. Within each "topic," the sentences are further bucketed into sub-domains by "function," and then each function into "data." This process of bucketing may be done using a tool that allows for easy "tagging" of such data in a visual manner. We may then gather more data in sub-domains that do not have adequate representation. The more common approach is to build a model, run a test with data withheld from the training set. "Topics" that perform poorly are candidates for adding more sentences. This approach allows for more targeted data collection.

Thus, as specifically shown in FIG. 6:
Step 600—Collect text data in domain.
Step 601—Split data into individual domains.
Step 602—Tag domains.
Step 603—Gather more data.
Step 604—None left? If no, go to step 601.
Step 605—Build system model, if yes in step 604.

Further, we preferably split training data into one set for each node in the hierarchy, and build a model for each node.

Figure 7:
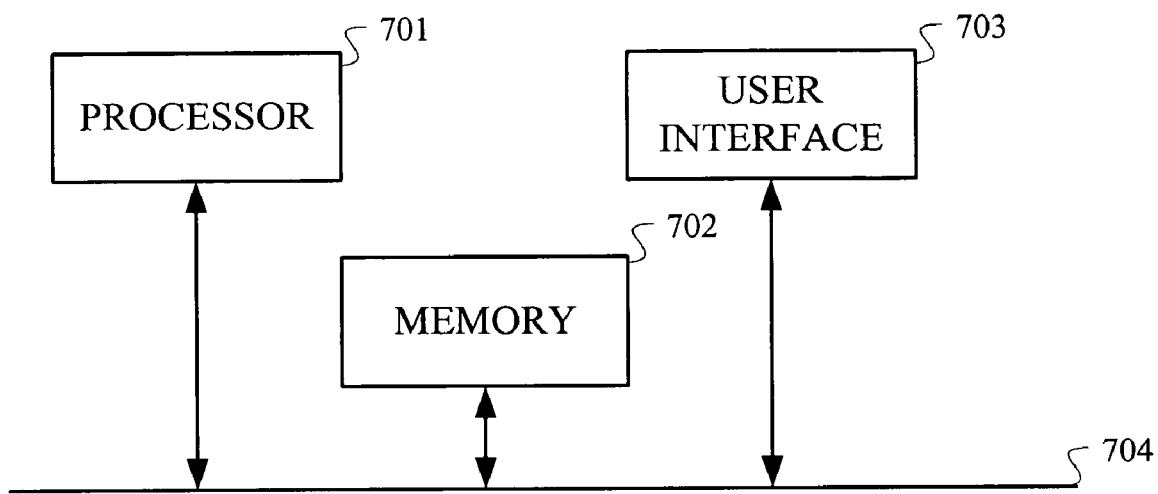
FIG. 7 illustrates a block diagram of a computing system for use in implementing a hierarchical system for extracting user intent from a spoken utterance, according to an embodiment of the invention.

Referring lastly to FIG. 7, a block diagram of an illustrative implementation of a computing system for use in implementing techniques of the invention is shown. More particularly, FIG. 7 represents a computing system which may implement the user intent extraction components and methodologies of the invention, as described above in the context of FIGS. 1 through 6. The architecture shown may also be used to implement a target system.

In this particular implementation, a processor 701 for controlling and performing methodologies described herein is coupled to a memory 702 and a user interface 703 via a computer bus 704.

It is to be appreciated that the term "processor" as used herein is intended to include any processing device, such as, for example, one that includes a CPU (central processing unit) or other suitable processing circuitry. For example, the processor may be a digital signal processor (DSP), as is known in the art. Also the term "processor" may refer to more than one individual processor. However, the invention is not limited to any particular processor type or configuration.

The term "memory" as used herein is intended to include memory associated with a processor or CPU, such as, for example, RAM, ROM, a fixed memory device (e.g., hard drive), a removable memory device (e.g., diskette), flash memory, etc. However, the invention is not limited to any particular memory type or configuration.

In addition, the term "user interface" as used herein is intended to include, for example, one or more input devices, e.g., keyboard, for inputting data to the processing unit, and/or one or more output devices, e.g., CRT display and/or printer, for providing results associated with the processing unit. The user interface may also include one or more microphones for receiving user speech. However, the invention is not limited to any particular user interface type or configuration.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

In any case, it should be understood that the components/steps illustrated in FIGS. 1 through 7 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for determining an intended action of a user of a computing system environment, the computing system environment comprising a voice system, the intended action being specified via a spoken input of the user, wherein the method comprises acts of:

obtaining a decoding of the spoken input of the user, wherein the voice system has a precise machine-based grammar to allow the user to invoke the intended action by speaking one or more predetermined voice commands and wherein the spoken input is a free form voice instruction that is different than the precise machine-based grammar; and extracting the intended action from the decoding of the spoken input using an iterative hierarchical extraction process comprising analyzing the decoding of the spoken input in multiple hierarchically dependent semantic stages, comprising:

determining a first level of classification of the intended action from the decoding of the spoken input during a first semantic stage of the iterative hierarchical extraction process, the first level of classification having a plurality of sub-classifications associated with the first level of classification; and determining, from among the plurality of sub-classifications associated with the first level of classification, a second level of classification of the intended action from the same decoding of the spoken input during a second semantic stage of the iterative hierarchical extraction process.

2. The method of claim 1, wherein the second level of classification has a plurality of sub-classifications associated with the second level of classification, and wherein extracting the intended action from the decoding of the spoken input using an iterative hierarchical extraction process comprising analyzing the decoding of the spoken input in multiple semantic stages further comprises determining, from among the plurality of sub-classifications associated with the second level of classification, a third level of classification of the intended action from the same decoding of the spoken input during a third semantic stage of the iterative hierarchical extraction process.

3. The method of claim 2, wherein the first level of classification represents a target associated with the intended action, the second level of classification represents a target action associated with the target, and the third level of classification represents data associated with the target action.

4. The method of claim 2, wherein the act of extracting the intended action further comprises selecting a number of top scoring labels at each semantic stage utilizing confidence scores and at least one rejection criterion.

5. The method of claim 4, wherein selecting a number of top scoring labels comprises determining a relative importance of at least a portion of the spoken input based at least in part on at least one auditory characteristic of the portion of the spoken input unrelated to semantic content of the spoken input.

6. The method of claim 1, further comprising providing one or more commands to the voice system based, at least in part, on the determination of the first level of classification and the second level of classification.

7. The method of claim 1, wherein the precise machine-based grammar is hierarchically arranged, and wherein the first level of classification and the second level of classification correspond to different levels within the grammar.

8. The method of claim 1, wherein the method comprises extracting a value for an attribute at each of the first semantic stage and the second semantic stage of the iterative hierarchical extraction process.

9. The method of claim 1, wherein the act of extracting the intended action comprises considering the decoding of the spoken input in its entirety during each of the first semantic stage and the second semantic stage of the iterative hierarchical extraction process.

10. The method of claim 1, wherein neither the first semantic stage nor the second semantic stage involves tagging each word of the decoding of the spoken input or attaching a semantic label.

11. At least one computer readable storage device encoded with a plurality of instructions that, when executed, cause at least one processor to perform a method for determining an intended action of a user of a computing system environment, the computing system environment comprising a voice system, the intended action being specified via a spoken utterance input of the user, wherein the method comprises acts of:
   obtaining a decoding of the spoken input of the user, wherein the voice system has a precise machine-based grammar to allow the user to invoke the intended action by speaking one or more predetermined voice commands and wherein the spoken input is a free form voice instruction that is different than the precise machine-based grammar; and
   extracting the intended action from the decoding of the spoken input using an iterative hierarchical extraction process comprising analyzing the decoding of the spoken input in multiple hierarchically dependent semantic stages, comprising:
      determining a first level of classification of the intended action from the decoding of the spoken input during a first semantic stage of the iterative hierarchical extraction process, the first level of classification having a plurality of sub-classifications associated with the first level of classification; and
      determining, from among the plurality of sub-classifications associated with the first level of classification, a second level of classification of the intended action from the same decoding of the spoken input during a second semantic stage of the iterative hierarchical extraction process.

12. The at least one computer readable storage device of claim 11, wherein the second level of classification has a plurality of sub-classifications associated with the second level of classification, and wherein extracting the intended action from the decoding of the spoken input using an iterative hierarchical extraction process comprising analyzing the decoding of the spoken input in multiple semantic stages further comprises determining, from among the plurality of sub-classifications associated with the second level of classification, a third level of classification of the intended action from the same decoding of the spoken input during a third semantic stage of the iterative hierarchical extraction process.

13. The at least one computer readable storage device of claim 12, wherein the first level of classification represents a target associated with the intended action, the second level of classification represents a target action associated with the target, and the third level of classification represents data associated with the target action.

14. The at least one computer readable storage device of claim 12, wherein the act of extracting the intended action further comprises selecting a number of top scoring labels at each semantic stage utilizing confidence scores and at least one rejection criterion.

15. The at least one computer readable storage device of claim 14, wherein selecting a number of top scoring labels comprises determining a relative importance of at least a portion of the spoken input based at least in part on at least one auditory characteristic of the portion of the spoken input unrelated to semantic content of the spoken input.

16. The at least one computer readable storage device of claim 11, wherein the method further comprises providing one or more commands to the voice system based, at least in part, on the determination of the first level of classification and the second level of classification.

17. The at least one computer readable storage device of claim 11, wherein the precise machine-based grammar is hierarchically arranged, and wherein the first level of classification and the second level of classification correspond to different levels within the grammar.

18. The at least one computer readable storage device of claim 11, wherein the method comprises extracting a value for an attribute at each of the first semantic stage and the second semantic stage of the iterative hierarchical extraction process.

19. The at least one computer readable storage device of claim 11, wherein the act of extracting the intended action comprises considering the decoding of the spoken input in its entirety during each of the first semantic stage and the second semantic stage of the iterative hierarchical extraction process.

20. An apparatus comprising:
   at least one processor programmed to determine an intended action specified via a spoken input of a user of a computing system environment comprising a voice system by:
      obtaining a decoding of the spoken input of the user, wherein the voice system has a precise machine-based grammar to allow the user to invoke the intended action by speaking one or more predetermined voice commands and wherein the spoken input is a free form voice instruction that is different than the precise machine-based grammar; and
      extracting the intended action from the decoding of the spoken input using an iterative hierarchical extraction process comprising analyzing the decoding of the spoken input in multiple hierarchically dependent semantic stages, comprising:
         determining a first level of classification of the intended action from the decoding of the spoken input during a first semantic stage of the iterative hierarchical extraction process, the first level of classification having a plurality of sub-classifications associated with the first level of classification; and
         determining, from among the plurality of sub-classifications associated with the first level of classification, a second level of classification of the intended action from the same decoding of the spoken input during a second semantic stage of the iterative hierarchical extraction process.

21. The apparatus of claim 20, wherein the second level of classification has a plurality of sub-classifications associated with the second level of classification, and wherein extracting the intended action from the decoding of the spoken input using an iterative hierarchical extraction process comprising analyzing the decoding of the spoken input in multiple semantic stages further comprises determining, from among the plurality of sub-classifications associated with the second level of classification, a third level of classification of the intended action from the same decoding of the spoken input during a third semantic stage of the iterative hierarchical extraction process.

22. The apparatus of claim 21, wherein the first level of classification represents a target associated with the intended action, the second level of classification represents a target action associated with the target, and the third level of classification represents data associated with the target action.

23. The apparatus of claim 21, wherein extracting the intended action further comprises selecting a number of top scoring labels at each semantic stage utilizing confidence scores and at least one rejection criterion.

24. The apparatus of claim 23, wherein selecting a number of top scoring labels comprises determining a relative importance of at least a portion of the spoken input based at least in part on at least one auditory characteristic of the portion of the spoken input unrelated to semantic content of the spoken input.

25. The apparatus of claim 20, wherein the at least one processor is further programmed to provide one or more commands to the voice system based, at least in part, on the determining of the first level of classification and the second level of classification.

26. The apparatus of claim 20, wherein the at least one processor is further programmed to generate one or more questions of the user and to use answers to the one or more questions to facilitate determining the intended action.

27. The apparatus of claim 20, wherein the at least one processor is further programmed to gather information from one or more sensors and use the information gathered from the one or more sensors to facilitate determining the intended action.

28. The apparatus of claim 20, wherein the precise machine-based grammar is hierarchically arranged, and wherein the first level of classification and the second level of classification correspond to different levels within the grammar.

29. The apparatus of claim 20, wherein extracting the intended action comprises extracting a value for an attribute at each of the first semantic stage and the second semantic stage of the iterative hierarchical extraction process.

30. The apparatus of claim 20, wherein extracting the intended action comprises considering the decoding of the spoken input in its entirety during each of the first semantic stage and the second semantic stage of the iterative hierarchical extraction process.

* * * * *